April 15, 1952     R. R. SCOTT     2,592,961
ADJUSTABLE SAFETY LATCH
Filed Nov. 22, 1948     2 SHEETS—SHEET 2
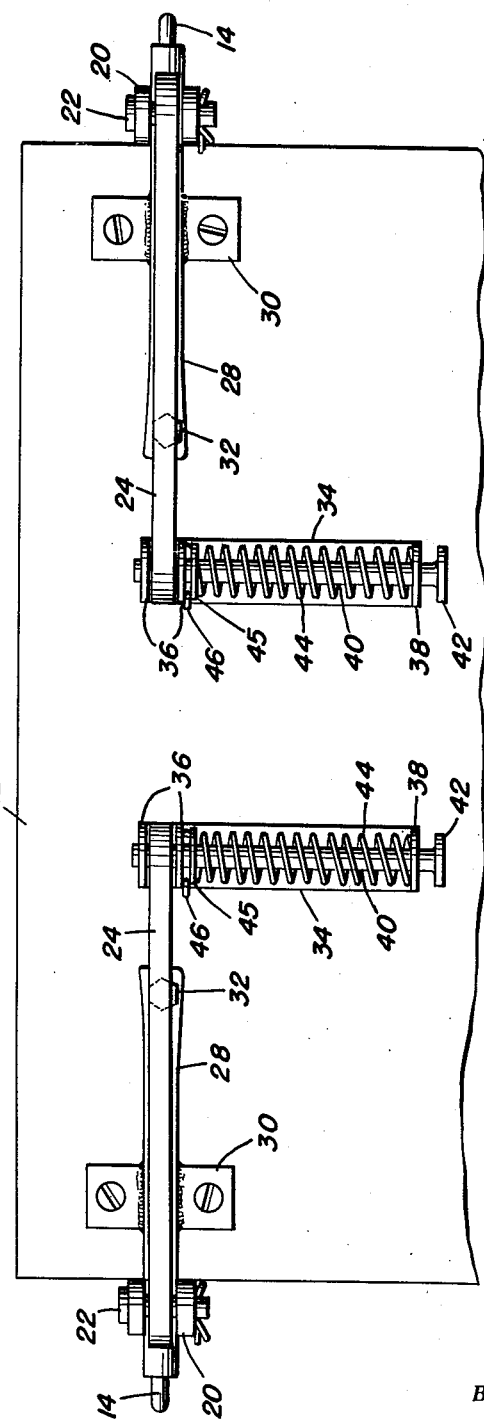
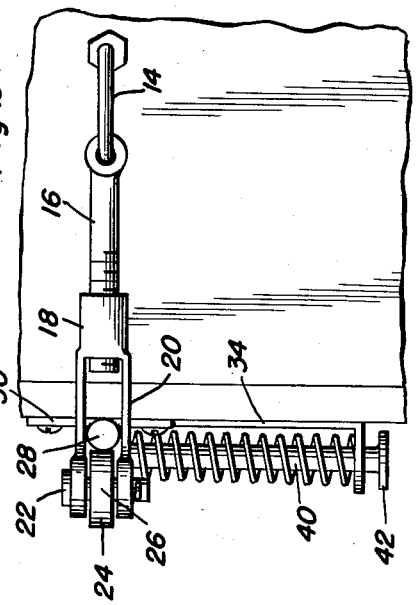
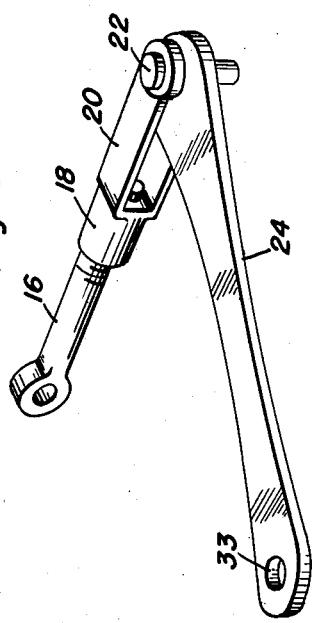
Inventor
Ray R. Scott
By *Clarence A. O'Brien and Harvey B. Jacobson*
Attorneys Patented Apr. 15, 1952

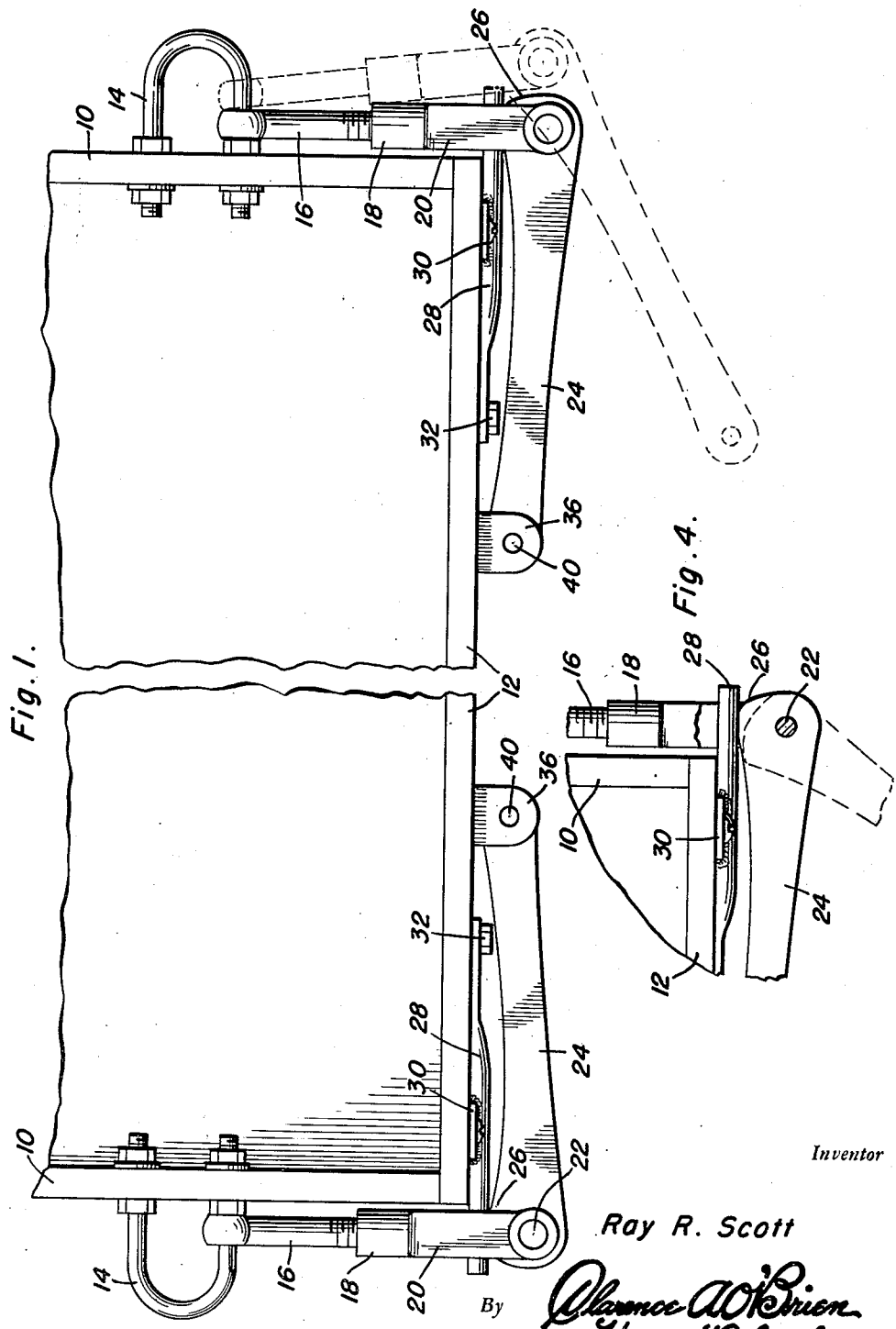

2,592,961

UNITED STATES PATENT OFFICE 2,592,961

ADJUSTABLE SAFETY LATCH

Ray R. Scott, Muskogee, Okla., assignor of seventy-five per cent to Clarence E. Brockman, Lebanon, Mo.

Application November 22, 1948, Serial No. 61,446

3 Claims. (Cl. 292—257)

This invention relates generally to latching means and more particularly to a safety latch for end gates and the like.

A primary object of this invention is to provide a latch which can be adjusted to hold an end gate or the like securely against a fixed structure, while being easily releasable.

Another object of this invention, of a specific nature, is to provide a latch having a link of adjustable length carrying a lever having a cam engageable with a dowel on the member to be latched, whereby the pressure of the latch member against the fixed structure, when the latch is in closed position, is variable according to the requirements encountered in actual employment of this invention.

Another object of this invention, allied to the preceding object, is to provide latching means for end gates of automotive vehicles, which will prevent rattling of the end gates while the vehicles are in transit.

And a last object to be mentioned specifically is to provide a latch assembly which is relatively inexpensive and practicable to manufacture, which is safe, convenient and simple to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a top plan view of a rear end portion of a truck with an end gate with this invention operatively applied thereon;

Figure 2 is a rear end elevational view of the structure shown in Figure 1, the view being taken from the rear end of the truck;

Figure 3 is a side elevational view, taken from the right hand side of Figure 1;

Figure 4 is another plan view, fragmentary in character, a portion of the clevis forming a part of the above mentioned link, being broken away to show the above mentioned dowel in plan, and the lever being shown in a second position in dash line as when the cam portion thereof is released from the dowel; and Figure 5 is a view in perspective, of the adjustable link and lever.

Corresponding characters of reference designate identical elements and portions throughout the specification and throughout the different views in the drawings.

Referring now to the drawings in detail, this invention is adapted to be used with an environment including such structure as a body of an automotive truck in which the vertical side walls 10 comprise abutment for an end gate 12, which for purposes of illustration, is represented in Figure 1 as being of the type which swings about a horizontal axis.

A pair of U-bolts 14 are rigidly secured to the vertical side members 10, and an eye bolt 16 is pivoted on each of these U-bolts 14. The eye bolt 16 is threaded for adjustable mounting in a threaded shank portion 18 of a clevis 20, the arms of which are apertured to receive a pin 22. The pin 22 is also inserted through one end of a lever 24 having a cam 26 adjacent this pivoted end for releasable engagement with a dowel 28. The dowel 28 is provided with attachment lugs 30 whereby the dowel is secured to the end gate 12, preferably on each side thereof in construction similar to that illustrated in Figure 1, so as to be engageable with the clevis 20 and the corresponding lever 24 on each side of the end gate. The dowels 28 may be further secured to the end gate by screws or bolts 32, and it will be obvious that the dowels must extend beyond the ends of the end gate and laterally of the side walls 10.

The other end of each lever 24 is apertured as indicated at 33 in Figure 5. Means for locking the said other end of the lever 24 in position latching the end gate will include a plate 34 rigidly securable to the end gate so that a pair of spaced apertured lugs 36 on this plate 34 may receive said other end of each lever 24 therebetween. The end plate will ordinarily be vertically elongated and the lower end of the plate will have another apertured lug 38. Each set of lugs 36 and 38 will have the apertures therein coaxial and a locking pin 40 will be slidably mounted therein, this locking pin having an enlarged head 42 to be grasped by hand and depressed against the action of a helical spring 44 compressed between the lower of the lugs 36 and the corresponding lug 38. The pin 40 will in each case be provided with a washer 45 held in place by a transverse smaller pin 46, illustrated in duplicate in Figure 2, this washer 45 engaging the upper end of the helical spring 44. It will be clear how the locking pins 40 may be depressed to allow the said other ends of the corresponding levers 24 to be entered between the lugs 36, whereafter the locking pins 40 are released and the corresponding springs 44 will force the upper ends of the locking pins through the apertures in the corresponding levers 24 and lugs 36.

The operation of this invention will be clearly understood in consideration of the foregoing description of the mechanical details thereof, taken in connection with the drawings and with the above recitation of the objects sought to be achieved by this invention. In recapitulation, it need only be added that the cam 26 is proportioned and positioned on each lever 24 so that the corresponding dowel 28 will be forced toward the side members 10, thus holding the end gate 12 firmly in place. It will also be clear how the entrance of the dowels 28 through the clevis 20 prevents vertical movement of the central portion of the latching devices when in locked positions. Adjustment of the device is made by turning the clevis upon the eye bolt 16. Apparently, further description is unnecessary.

Obviously many minor variations from the embodiment illustrated may be resorted to without departure from the spirit of this invention and the scope of this invention should be determined only as limited by a proper interpretation of the terms used in the subjoined claims.

Having described the invention, what is claimed as new is:

1. A safety latch for end gates and the like including a dowel comprising an inflexible rod having a flattened apertured terminal and apertured lugs integral with and extending transversely of said dowel intermediate its ends for securement to the member to be latched, a link having one end bifurcated to fit over a portion of said dowel, attachment means for the other end of said link, a lever pivoted to the bifurcated end of said link and having a cam at the pivoted end engageable with said dowel when the lever is in one position, and means adapted to be secured to the member to be latched for releasably securing the other end of the lever when the lever is in said position.

2. A latch according to claim 1 and wherein said link is adjustable as to length and comprises an eye bolt and a clevis threaded on the eye bolt, the diameter of the dowel being only slightly less than the spacing of the arms of said clevis so that the dowel and the clevis guide the lever into registration with said means for securing the other end of the lever.

3. A latch according to claim 1 and wherein said last mentioned means comprises a plate having lugs on the side thereof adjacent said lever when said lever is in said position and having apertures, said other end of the lever also having an aperture, and a spring biased locking pin arranged coaxially with the apertures in said lugs.

RAY R. SCOTT.

REFERENCES CITED

The following references are of record in the file of this patent:

UNITED STATES PATENTS

| Number | Name | Date |
|---|---|---|
| 366,143 | Andrews et al. | July 5, 1887 |
| 736,772 | Petersen | Aug. 18, 1903 |
| 1,245,409 | Voss | Nov. 6, 1917 |
| 2,324,356 | Brown | July 13, 1943 |

FOREIGN PATENTS

| Number | Country | Date |
|---|---|---|
| 697,126 | Germany | Oct. 7, 1940 |